United States Patent [19]

Royce et al.

[11] 4,316,816

[45] Feb. 23, 1982

[54] METHOD FOR PREPARING COPPER-ALUMINUM-GOLD-ACTIVATED ZINC-SULFIDE PHOSPHORS

[75] Inventors: Martin R. Royce, Lancaster; Donnavon D. Shaffer, Lititz, both of Pa.

[73] Assignee: RCA Corporation, New York, N.Y.

[21] Appl. No.: 967,094

[22] Filed: Dec. 6, 1978

[51] Int. Cl.³ .............................................. C09K 11/50
[52] U.S. Cl. .............................................. 252/301.6 S
[58] Field of Search ................................... 252/301.6 S

[56] References Cited

U.S. PATENT DOCUMENTS

| | | | |
|---|---|---|---|
| 2,623,858 | 12/1952 | Kroger | 252/301.6 S |
| 3,595,804 | 7/1971 | Martin | 252/301.6 S |
| 3,922,233 | 11/1975 | Torii et al. | 252/301.6 S |
| 4,140,940 | 2/1979 | Vehara et al. | 252/301.6 S X |
| 4,151,442 | 4/1979 | Koga et al. | 252/301.6 S X |

FOREIGN PATENT DOCUMENTS

| | | | |
|---|---|---|---|
| 49-39586 | 4/1974 | Japan | 252/301.6 S |
| 7703267 | 9/1977 | Netherlands | 252/301.6 S |

OTHER PUBLICATIONS

Blazhnova, "A Kad Nauk Eston. S.S.R., Tartu", 1957, pp. 270–288.

*Primary Examiner*—Jack Cooper
*Attorney, Agent, or Firm*—E. M. Whitacre; G. H. Bruestle; L. Greenspan

[57] ABSTRACT

A method for preparing a phosphor including heating at its reaction temperature in a covered container a mixture of zinc sulfide, an activator quantity of copper as a compound thereof, an activator quantity of aluminum as a compound thereof, an activator quantity of gold as a compound thereof, a minor proportion of elemental selenium, a minor proportion of elemental sulfur and a minor proportion of carbon. The reaction mixture is heated in the container and the product is then cooled. After cooling, whatever carbon remains is removed as by screening.

6 Claims, No Drawings

METHOD FOR PREPARING COPPER-ALUMINUM-GOLD-ACTIVATED ZINC-SULFIDE PHOSPHORS

BACKGROUND OF THE INVENTION

This invention relates to a novel method for preparing phosphors that can be used in the viewing screens of television picture tubes.

Color television picture tubes are cathode-ray tubes which employ a luminescent viewing screen that is selectively excited with the cathode rays generated in the tube. The screen usually employs a red-emitting phosphor, a green-emitting phosphor and a blue-emitting phosphor. Various green-emitting phosphors have been employed as the tube has evolved to its present state. Presently, the most common, and brightest, green-emitting phosphor with the desired emission color is copper-and-aluminum-activated zinc-cadmium sulfide (ZnCdS:Cu:Al). Because the use of cadmium appears to be undesirable for environmental safety reasons, attempts have been made to provide suitable cadmium-free green-emitting phosphors. Of these attempts, zinc sulfide activated with copper, aluminum and gold (ZnS:Cu:Al:Au) appears to be the most promising. Our best results were obtained by making the phosphor by a process which includes heating a mixture of metal-ion compounds openly exposed to a gaseous hydrogen sulfide atmosphere at its reaction temperatures. Such processes are difficult to practice on a commercial scale because of the corrosive effects of hydrogen sulfide atmospheres at the required reaction temperatures. Also, the phosphors produced by such processes do not exhibit the desired emission color.

It is known to make ZnCdS:Cu:Al phosphor on a commercial scale by a process which includes heating a mixture of metal-ion compounds, elemental sulfur and elemental carbon in a covered container at its reaction temperatures, thereby avoiding the need for heating a mixture openly exposed to a hydrogen sulfide atmosphere. Due to the large ionic radius of gold ions, it is extremely difficult to incorporate the needed concentrations of gold ions into a zinc-sulfide crystal lattice by this latter process in order to obtain the green emission color that is particularly desired for use in color television picture tubes.

SUMMARY OF THE INVENTION

The novel method includes heating in a covered container a mixture of zinc sulfide together with activator quantities of copper, aluminum and gold and minor proportions of elemental sulfur, elemental selenium and elemental carbon at its reaction temperature; and then cooling the reaction product. It is preferred to include ammonium iodide in the mixture.

By including a quantity of elemental selenium in the mixture during the heating step, the emission color of the product can be shifted to the emission color particularly desired for the green emitter in color television picture tubes. This shift is in excess of what is normally expected. By the novel method, gold ions are more readily incorporated into the zinc-sulfide lattice, and the synthesis of the phosphor can be accomplished without heating the mixture openly exposed in a hydrogen-sulfide atmosphere. The phosphor product of the novel method can be similar in emission color with adequate brightness to the commonly-used ZnCdS:Cu:Al phosphor. This cannot be accomplished by the use of copper and gold alone. In the instances where one is attempting to match the color and efficiency of the commonly-used ZnS:Cu:Al:Au phosphor, the incorporation of elemental selenium permits the use of lower gold contents.

DESCRIPTION OF THE PREFERRED EMBODIMENT

Example

To 200 grams of zinc-sulfide particles suspended in water are added 0.008 weight percent copper as the nitrate, 0.016 weight percent aluminum as the nitrate, and 0.025 weight percent gold as the chloride. The mixture is dried and sieved. About 2 weight percent elemental selenium, about 2 weight percent ammonium iodide, about 4 weight percent of powdered sulfur and about 1 weight percent of coconut carbon granules (2–8 mesh particle size) are randomly distributed in the mass. All weight percents are with respect to the weight of zinc sulfide. The preferred coconut carbon granules are activated carbon PCB4X10 marketed by Pittsburgh Activated Charcoal Co., Pittsburgh, Pa. The above mixture is placed in a quartz beaker, covered with a lid, and this assembly enclosed within another beaker also covered with a lid. The entire assembly is heated at about 1000° C. for about 30 minutes. The charge when cooled is sieved through a 12-mesh screen and then through a 60-mesh screen to remove any remaining carbon granules. Finally the product is sieved through a 400-mesh screen.

The product is a copper-aluminum-gold-activated zinc-sulfide phosphor containing incorporated selenium and having the formula

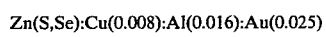

$$Zn(S,Se):Cu(0.008):Al(0.016):Au(0.025)$$

based on the formulation of the raw batch. The product is both photoluminescent and cathodoluminescent, emitting a visually green luminescence upon excitation. When compared with a commercially-used ZnCdS:Cu:Al, the phosphor had about 84 percent peak efficiency and about 87 percent visual brightness. The CIE coordinates of the emission are about $x=0.345$ and $y=0.579$. The product had a median particle size of about 10 microns.

GENERAL CONSIDERATIONS

The novel method incorporates copper, aluminum and gold into sulfide-type phosphors using a combination of elemental selenium, carbon, and sulfur intimately mixed with the host material by the general method disclosed in U.S. Pat. No. 3,595,804 issued July 27, 1971 to J. S. Martin. In this manner, production quantities to zinc sulfide activated with copper, aluminum and gold may be prepared economically in suitably large batches with commercially-useful luminescent properties.

The inclusion of small amounts of elemental selenium, preferably in the range of about 1 to 4 weight percent of the weight of zinc sulfide, is believed to significantly "open" the zinc sulfide lattice and enable gold ions to diffuse in. Selenium ions are incorporated into the lattice, substituting for sulfur ions. The use of elemental selenium permits the addition of less gold, resulting in a net cost savings on materials (gold vs. selenium). The incorporated selenium has the effect of shifting the emission color of the phosphor product slightly towards yellow wavelengths.

The table compares phosphors made by the novel method (samples D and E) which contain gold and selenium with phosphors prepared by a similar method but omitting one or both of gold and selenium (samples A, B and C). The control sample is a typical prior ZnCdS:Cu:Al phosphor.

TABLE

| Sample | Composition | | | | Peak Eff. | Visual Brightness | CIE Co-ordinates | |
|---|---|---|---|---|---|---|---|---|
| | Cu (ppm) | Al (ppm) | Au (ppm) | Se % | | | "x" | "y" |
| Control | 60 | 60 | 0 | 0 | 100 | 100 | .357 | .596 |
| A | 80 | 160 | 0 | 0 | 108 | 96 | .291 | .596 |
| B | 80 | 160 | 250 | 0 | 92 | 92 | .328 | .589 |
| C | 80 | 160 | 0 | 2 | 101 | 94 | .300 | .585 |
| D | 80 | 160 | 150 | 2 | 91 | 91 | .333 | .587 |
| E | 80 | 160 | 250 | 2 | 84 | 87 | .345 | .579 |

In the Table, the CIE "x" coordinate indicates that the combination of selenium and gold produces by the novel method a greater shift to higher values (toward longer wavelengths) than was expected for each component acting individually or in combination. A comparison of samples B and D demonstrates that the concentration of gold can be reduced by incorporating 2% selenium. The value for visual brightness is the actual brightness that has been adjusted to consider the spectral sensitivity of a human eye. The values for visual brightness indicate that the novel method produces phosphors with a practical and usable brightness with the desired green emission color.

It is preferable to use carbon bodies which are coarser than 10 mesh, although any size and any kind of carbon may be used to practice the novel method. The carbon may be present in an amount between 0.1 and 10 weight percent of the weight of the zinc sulfide and preferably about 0.5 to 2 weight percent. The sulfur may be present in an amount between 1.0 to 10.0 weight percent of the weight of the zinc sulfide, and preferably between 2.0 and 5.0 weight percent. The ammonium iodide may be present in an amount up to about 5 weight percent of the weight of the zinc sulfide. It appears to be an accelerator and helps incorporate the activators while the sulfur atmosphere is present.

In the final phosphor product as well as in the initial mixture, the proportions of zinc sulfide, copper, aluminum and gold are those which are known in the art to produce useful phosphors. Generally, the activator copper is present in an amount between 40 and 200 weight parts per million parts of host material (ppm). The aluminum and gold are each present preferably in an amount between 40 and 600 weight parts per million parts of host. The host material is zinc sulfide, which, after firing, contains about 1 to 2 weight percent zinc selenide.

The reaction may be carried out in any container which is essentially nonreactive with the constituents of the batch and which does not contain contaminants for the reaction product. The reaction is preferably carried out at about 900° to 1050° C. in a period of about 0.25 to 1.0 hour. Upon cooling, the reaction product is sieved. The sieve size is chosen to pass the phosphor material and to retain residual carbon bodies which remain in the reaction product. It is preferred to use a sieve which is 100 mesh or finer to remove residual carbon particles from the product.

We claim:

1. A method for preparing a cathodoluminescent phosphor consisting essentially of zinc sulfide activated with aluminum, copper and gold comprising heating in a covered container a mixture consisting essentially of zinc sulfide, an activator quantity of copper as a compound thereof, an activator quantity of aluminum as a compound thereof, an activator quantity of gold as a compound thereof, ammonium iodide in an amount that is adequate to accelerate the incorporation of said quantities of copper, aluminum and gold into said zinc sulfide, elemental selenium in an amount such that said quantity of gold is more readily incorporated into said zinc sulfide, elemental sulfur and elemental carbon at temperatures in the range of about 900° to 1050° C. for a period of about 0.25 to 1.0 hour, and then cooling the reaction product.

2. The method defined in claim 1 wherein said elemental selenium is present in an amount between about 1 and 4 weight percent of the weight of said zinc sulfide.

3. The method defined in claim 2 wherein said elemental sulfur is present in an amount between about 1.0 and 10 weight percent and said carbon is present in an amount between about 0.1 and 10.0 weight percent, each with respect to the weight of said zinc sulfide.

4. The method defined in claim 3 wherein said mixture contains 40 to 200 ppm copper, 40 to 600 ppm aluminum and 40 to 600 ppm gold.

5. The method defined in claim 2 wherein said mixture includes ammonium iodide in a significant amount up to about 5 weight percent of the weight of said zinc sulfide.

6. The method defined in claim 5 wherein said carbon is present in an amount between 0.5 and 2.0 weight percent, and said sulfur is present in an amount between 2.0 and 5.0 weight percent, each with respect to the weight of said zinc sulfide.

* * * * *